US012160649B2

United States Patent
Noh et al.

(10) Patent No.: US 12,160,649 B2
(45) Date of Patent: Dec. 3, 2024

(54) ELECTRONIC DEVICE COMPRISING CAMERA MODULE FOR OBTAINING DEPTH INFORMATION

(71) Applicant: SAMSUNG ELECTRONICS CO., LTD., Suwon-si (KR)

(72) Inventors: Jeongrae Noh, Suwon-si (KR); Jiwoo Lee, Suwon-si (KR); Jaeyoung Roh, Suwon-si (KR); Seokgyu Ban, Suwon-si (KR); Dongjo Woo, Suwon-si (KR); Intae Jun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 83 days.

(21) Appl. No.: 17/835,590

(22) Filed: Jun. 8, 2022

(65) Prior Publication Data

US 2023/0079163 A1  Mar. 16, 2023

(30) Foreign Application Priority Data

Sep. 15, 2021 (KR) .................. 10-2021-0123568

(51) Int. Cl.
*H04N 23/55* (2023.01)
*G02B 5/20* (2006.01)
(Continued)

(52) U.S. Cl.
CPC ............. *H04N 23/55* (2023.01); *G02B 5/208* (2013.01); *G06T 7/55* (2017.01); *H04N 23/45* (2023.01);
(Continued)

(58) Field of Classification Search
CPC ........ H04N 23/55; H04N 23/45; H04N 23/53; H04N 23/54; H04N 23/80; H04N 23/959;
(Continued)

(56) References Cited

U.S. PATENT DOCUMENTS 9,497,380 B1 * 11/2016 Jannard .................. H04N 23/90
2006/0017834 A1 * 1/2006 Konno ............... G02B 13/0065
348/335
(Continued)

FOREIGN PATENT DOCUMENTS

JP        2013041141 A  *  2/2013
KR       10-1929807        12/2018
KR    10-2020-0017304       2/2020

*Primary Examiner* — Nasim N Nirjhar
(74) *Attorney, Agent, or Firm* — Nixon & Vanderhye P.C.

(57) ABSTRACT

An electronic device includes a processor; a first camera module comprising a camera including a first lens assembly having a first field of view (FOV) and a second camera module comprising a camera spaced apart a first camera module and including a second lens assembly having a second FOV narrower than the first FOV; wherein the first camera module includes an image sensor and a filter including a glass plate spaced apart the image sensor and disposed on the image sensor, and a layer disposed on the glass plate and configured to absorb a portion of infrared light among the light transmitted through the first lens assembly, wherein the processor is configured to obtain depth information about on the subject located within the second FOV based on data about the light passing through the filter, which is obtained through the image sensor.

18 Claims, 14 Drawing Sheets

(51) Int. Cl.
  *G06T 7/55* (2017.01)
  *H04N 23/45* (2023.01)
  *H04N 23/53* (2023.01)
  *H04N 23/54* (2023.01)
  *H04N 23/80* (2023.01)
  *H04N 23/959* (2023.01)
  *H04N 25/11* (2023.01)

(52) U.S. Cl.
  CPC ............ *H04N 23/53* (2023.01); *H04N 23/54* (2023.01); *H04N 23/80* (2023.01); *H04N 23/959* (2023.01); *H04N 25/11* (2023.01); *G06T 2207/20228* (2013.01)

(58) Field of Classification Search
  CPC .. H04N 25/11; H04N 5/33; H04N 2013/0081; H04N 23/57; H04N 23/687; H04N 23/698; H04N 23/90; G02B 5/208; G02B 5/282; G06T 7/55; G06T 2207/20228; H01L 31/00
  See application file for complete search history.

(56) References Cited

U.S. PATENT DOCUMENTS

| | | | |
|---|---|---|---|
| 2018/0109710 A1* | 4/2018 | Lee | H04N 23/45 |
| 2021/0366968 A1* | 11/2021 | Carrion | H04N 13/236 |
| 2023/0152672 A1* | 5/2023 | Bidwell | G03B 17/14 |
| | | | 396/419 |

* cited by examiner

ELECTRONIC DEVICE COMPRISING CAMERA MODULE FOR OBTAINING DEPTH INFORMATION

CROSS-REFERENCE TO RELATED APPLICATION

This application is based on and claims priority under 35 U.S.C. § 119 to Korean Patent Application No. 10-2021-0123568, filed on Sep. 15, 2021, in the Korean Intellectual Property Office, the disclosure of which is incorporated by reference herein in its entirety.

BACKGROUND

Field

The disclosure relates to an electronic device including a camera module for obtaining depth information.

Description of Related Art

Demand for electronic devices (e.g., smartphones or tablet PCs) including camera modules is increasing. An electronic device including a camera module may obtain a video or an image through the camera module, synthesize images through the camera module, and provide various effects such as correction of the obtained image.

The electronic device may include a plurality of camera modules. A plurality of camera modules may perform different functions. When the filter included in the camera module is equally applied to a plurality of camera modules, the production cost of the camera module may increase.

SUMMARY

According to an example embodiment, an electronic device may comprise: a processor; a first camera module comprising a camera including a first lens assembly having a first field of view (FOV) and a second camera module comprising a camera spaced apart a first camera module and including a second lens assembly having a second FOV narrower than the first FOV; wherein the first camera module includes an image sensor and a filter including a glass plate spaced apart from the image sensor and disposed on the image sensor, and a layer disposed on the glass plate and configured to absorb a portion of infrared light among the light transmitted through the first lens assembly, wherein the processor is configured to obtain depth information about on a subject located within the second FOV based on data about light passing through the filter obtained through the image sensor.

According to an example embodiment, an electronic device may comprise: a housing; an image sensor disposed within the housing to one surface of the housing; a lens assembly including a lens exposed through an opening formed on the housing; a glass plate disposed within the housing spaced apart from the image sensor and disposed on the image sensor; a first layer disposed on the glass plate and configured as a single organic material layer configured to absorb a portion of infrared light among the light transmitted through the lens assembly; a second layer disposed on the first layer and including a single inorganic material layer having rigidity configured to protect the first layer; and a processor configured to obtain a depth information about a subject in an image obtained via another image sensor distinct from the image sensor, based on data about light passing through a filter configured as a glass plate, the first layer and the second layer through the image sensor, the data being obtained through the image sensor.

The electronic device according to an example embodiment can form a structure simpler than a reflective filter and reduce manufacturing time by configuring a filter included in the depth camera module as a layer absorbing infrared rays.

According to an example embodiment, the filter included in the depth camera module has a little change in optical characteristics according to the incident angle, so that the electronic device may increase the accuracy of depth information of the subject.

The effects that can be obtained from the present disclosure are not limited to those described above, and any other effects not mentioned herein will be clearly understood by those having ordinary knowledge in the art to which the present disclosure belongs, from the following description.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 13 is a diagram illustrating an example of obtaining an image having an out-focus effect from a plurality of

DETAILED DESCRIPTION

Figure 1:
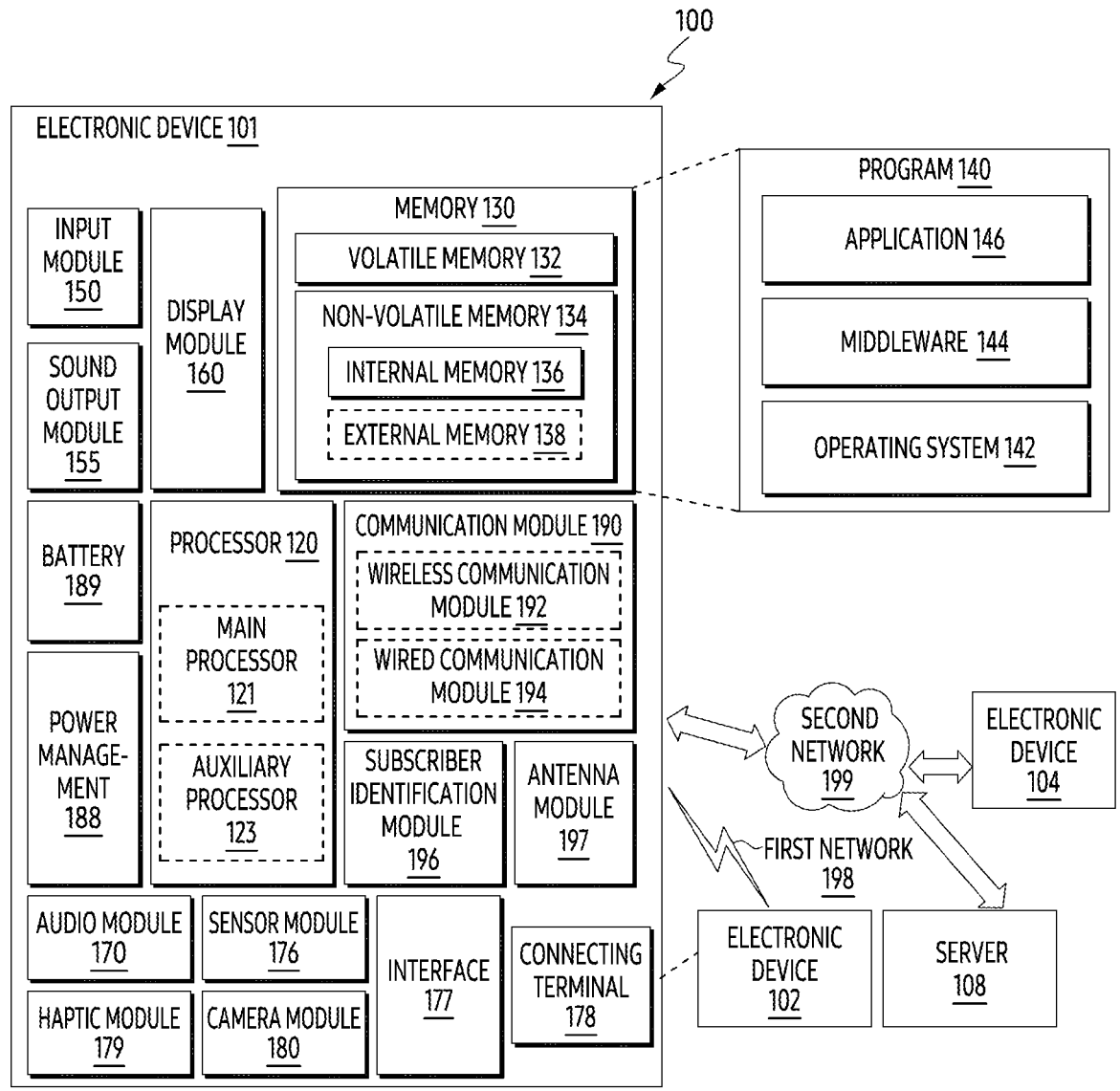
FIG. 1 is a block diagram illustrating an example electronic device in a network environment according to various embodiments.

FIG. 1 is a block diagram illustrating an example electronic device in a network environment according to various embodiments.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments of the disclosure, at least one of the components (e.g., the connecting terminal 178) may be omitted from the electronic device 101, or one or more other components may be added in the electronic device 101. In various embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high-definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to an embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to address, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to certain embodiments of the disclosure, the antenna module 197 may be a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low latency services using, e.g., distributed computing or mobile edge computing. In an embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
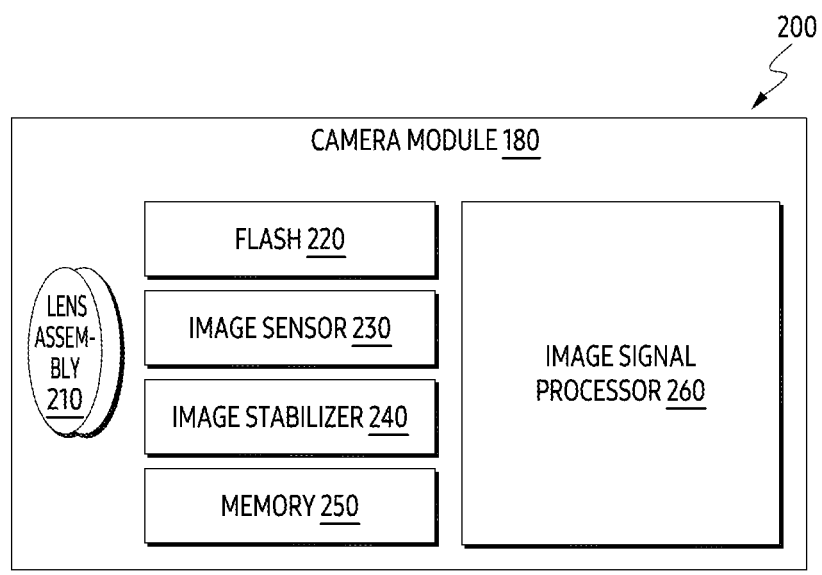
FIG. 2 is a block diagram illustrating an example configuration of a camera module according to various embodiments.

FIG. 2 is a block diagram 200 illustrating an example configuration of the camera module 180 according to various embodiments. Referring to FIG. 2, the camera module 180 may include a lens assembly 210, a flash 220, an image sensor 230, an image stabilizer 240, memory 250 (e.g., buffer memory), and/or an image signal processor (e.g., including processing circuitry) 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may include various processing circuitry and perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display module 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
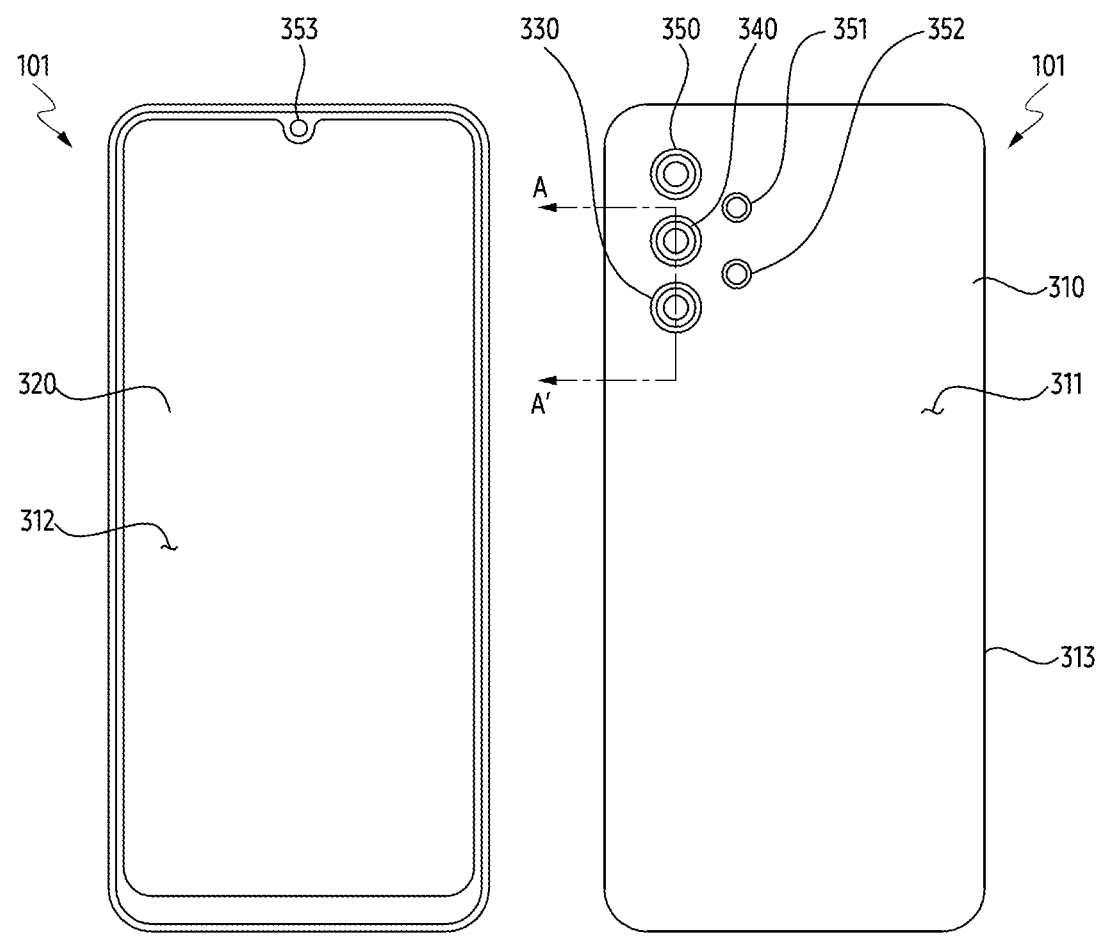
FIG. 3 is a diagram illustrating a top view and a bottom view of an electronic device according to various embodiments.

FIG. 3 is a diagram illustrating a top view and a bottom view of the electronic device 101 according to various embodiments.

Referring to FIG. 3, the electronic device 101 may include a housing 310, a display 320, and a plurality of camera modules 330, 340, 350, and 351.

The housing 310 may include a first surface 311, a second surface 312 facing the first surface 311 and side surfaces 313 formed along at least a portion of edges of the first surface 311 and the second surface 312. The first surface 311 and the second surface 312 may be spaced apart from each other with a space.

According to an embodiment, the display 320 may form the second surface 312 of the housing 310. The display 320 may visually display information externally. The second surface 312 on which the display 320 is disposed may include a front camera module 353.

According to an embodiment, at least a portion of a plurality of camera modules 330, 340, 350, and 351 (e.g., the camera module 180 of FIG. 1) and the light emitting module 352 (e.g., the flash 220 of FIG. 2) may be exposed through openings formed on the first surface 311.

Each of a plurality of camera modules 330, 340, 350, and 351 may be a module having different functions. For example, the first camera module 330 may be a depth camera. The first camera module 330 may obtain depth information on a subject in the obtained image. The subject may be an object photographed through a plurality of camera modules 330, 340, 350, and 351. The depth information may be a distance from at least one of a plurality of camera modules 330, 340, 350, and 351 to a subject. The first camera module 330 may be used to obtain depth information on a subject based on data on light transmitted to the first camera module 330 and light transmitted to other camera modules of a plurality of camera modules 330, 340, 350, and 351.

The second camera module 340 may be a wide camera, and the third camera module 350 may be an ultra-wide camera. The second camera module 340 may have a field of view (FOV) wider than a viewing angle of the human eyeball. The third camera module 350 may have a wider angle of view than that of the second camera module 340. According to an embodiment, the second camera module 340 may have higher pixels than the first camera module 330 and the third camera module 350. According to an embodiment, the electronic device 101 may obtain an image having a high resolution using the second camera module 340. The image obtained using the third camera module 350 may obtain an image having a wider area than the image obtained using the second camera module 340. The fourth camera module 351 may be a macro camera for close-up photography. The fourth camera module 351 may photograph the subject at a closer distance than the second camera module 340.

The light emitting module 352 (e.g., the flash 220 of FIG. 2) may enhance light emitted or reflected from a subject for photographing at a low illuminance. The light emitting module 352 may emit light toward the subject in order to enhance light emitted or reflected from the subject using at least one and more light emitting diode.

Figure 4:
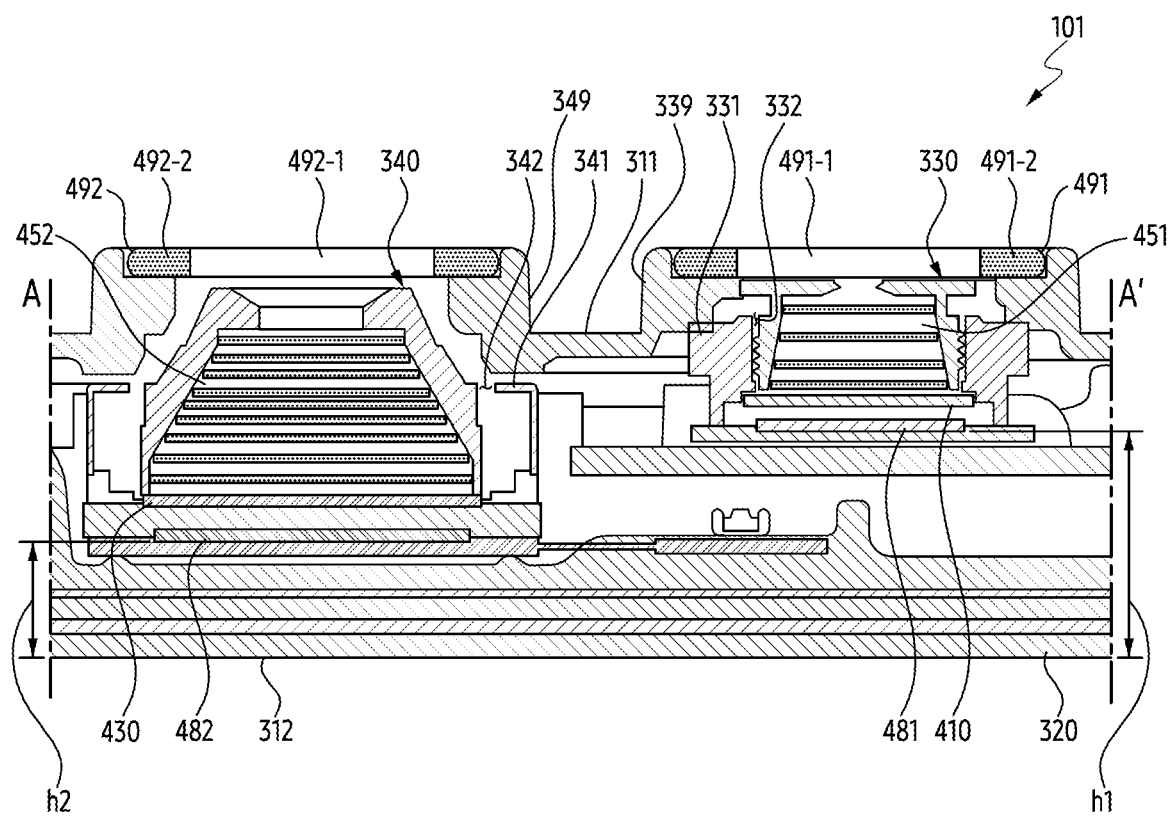
FIG. 4 is a cross-sectional view of an electronic device taken along line A-A' of FIG. 3, according to various embodiments.

FIG. 4 is a cross-sectional view of an electronic device taken along line A-A' of FIG. 3, according to various embodiments.

Referring to FIG. 4, the electronic device 101 may include a first camera module 330 and a second camera module 340. The first camera module 330 may include a first lens assembly 451 (e.g., the lens assembly 210 of FIG. 2), and the second camera module 340 may include a second lens assembly 452.

According to an embodiment, a portion of the first lens assembly 451 may be exposed to the outside through the first camera window 491, and a portion of the second lens assembly 452 may be exposed to the outside through the second camera window 492. The first camera window 491 may include a first transparent region 491-1 and a first opaque region 491-2 distinct from the first transparent region 491-1, and the second camera window 492 may include a second transparent region 492-1 and a second opaque region 492-2 distinct from the second transparent region 492-1. The first camera window 491 may be spaced apart from the second camera window 492. The first camera module 330 may be exposed toward the first transparent region 491-1 through the opening 332 of the first camera housing 331. The second camera module 340 may be exposed toward the second transparent region 492-1 through the opening 342 of the second camera housing 341. The first camera window 491 and the second camera window 492 are described as distinct windows but are not limited thereto. According to an embodiment, an integrated window may include the first transparent region 491-1 disposed on the first lens assembly 451, the second transparent region 492-1 disposed on the second lens assembly 452 and spaced apart from the first transparent region 491-1, and the opaque region distinct from the first transparent region 491-1 and the second transparent region 492-1.

According to an embodiment, the first camera enclosure 339 may support the first camera window 491, and the second camera enclosure 349 may support the second camera window 492. Although the first camera enclosure 339 and the second camera enclosure 349 are described as separate configurations, it is not limited thereto and may be integrally formed. The first camera enclosure 339 and the second camera enclosure 349 may be disposed through an opening formed in the first surface 311 of the housing 310.

Each of the first lens assembly 451 and the second lens assembly 452 may include a plurality of lenses. The first lens assembly 451 and the second lens assembly 452 may be different according to a function of a camera module including each lens assembly. For example, according to the function of the camera module in which the lens assembly is installed, the angle of view, focal length, auto focus, f number, or optical zoom characteristics may be determined in the lens assembly. The angle of view refers to the photographing range of the lens, and the larger the angle, the wider the screen may be captured. The focal length may be a distance between a focal point, which is a point where parallel traveling light passes through an optical element such as a lens and then gathers, and a reference point of the lens. The auto focus automatically focuses on the subject and refers to an auto-focus (AF) function and may be applied to the second camera module 340. The f number may refer, for example, to the ratio of the focal length to the diameter of the lens, and the brightness of the image is inversely proportional to the square of the f number. The first camera module 330 may be used as a depth camera module. The first camera module 330 may obtain depth information with a subject. The first lens assembly 451 may have an angle of view greater than that of the second lens assembly 452. The first lens assembly 451 may have an f number greater than the f number of the second lens assembly 452.

The first lens assembly 451 may include fewer lenses than the second lens assembly 452. Since the first camera module 330 obtains only depth information, the number of lenses of the first lens assembly 451 may be small. The second camera module 340 may have many lenses of the second lens assembly 452 in order to obtain clear image quality information and a large amount of light.

The first filter 410 may be disposed in a direction from the first lens assembly 451 toward the second surface 312 on which the display 320 is disposed, and the second filter 430 may be disposed in a direction from the second lens assembly 452 toward the second surface 312 on which the display 320 is disposed. According to an embodiment, the first filter 410 may be an infrared absorption filter. The infrared absorbing filter may be configured to absorb a portion of infrared light among the light transmitted to the infrared absorbing filter through the first lens assembly 451. The first filter 410 may include an organic material that absorbs infrared rays. The light passing through the first filter 410 may be transmitted to the first image sensor 481. The first image sensor 481 may not include a color filter. For example, the processor 120 may be configured to obtain data on a monochromatic image using the first image sensor 481. However, the present disclosure is not limited thereto, and the first image sensor 481 may include a color filter and may be used to obtain data on a color image.

According to an embodiment, the second filter 430 may be an infrared reflective filter. The infrared reflective filter may be configured to reflect at least a portion of infrared rays among light transmitted to the infrared reflective filter through the second lens assembly 452. The second filter 430 may include a plurality of layers including an inorganic material to reflect infrared rays. Light passing through the second filter 430 may be transmitted to the second image sensor 482.

The first image sensor 481 may be disposed to be spaced apart from the first filter 410 in a direction toward the display 320, and the second image sensor 482 may be disposed to be spaced apart from the second filter 430 in a direction toward the display 320.

The distance h1 from the display 320 to the first image sensor 481 may be farther than the distance h2 from the display 320 to the second image sensor 482. A lens configuration of the first lens assembly 451 may be different from the lens configuration of the second lens assembly 452. For example, the number of lenses of the first lens assembly 451 may be less than the number of lenses of the second lens assembly 452. The length of the barrel surrounding the first lens assembly 451 may be shorter than the length of the barrel surrounding the second lens assembly 452, and the entire length of the first lens assembly 451 may be shorter than the entire length of the second lens assembly 452. The first image sensor 481 disposed below the first lens assembly 451 may have a closer distance from the first surface 311 than the second image sensor 482 disposed below the second lens assembly 452.

According to an embodiment, a resolution of the first image sensor 481 may be lower than a resolution of the second image sensor 482. The number of lenses and pixels of the first image sensor 481 may be less than the number of lenses and pixels of the second image sensor 482. The first image sensor 481 may have a sufficient resolution to obtain a sufficient image to obtain depth information.

According to the above-described embodiment, the processor 120 (e.g., the processor 120 of FIG. 1) may provide an out-focus effect by synthesizing images obtained using the first camera module 330 and the second camera module 340. The processor 120 may obtain depth information to provide an out-focus effect using the first camera module 330. The first lens assembly 451 of the first camera module 330 includes lenses enough to obtain depth information through the first camera module 330, and the first filter 410 is configured to implement a function of a filter to obtain depth information using the first camera module 330, thereby achieving manufacturing cost reduction.

Figure 5:
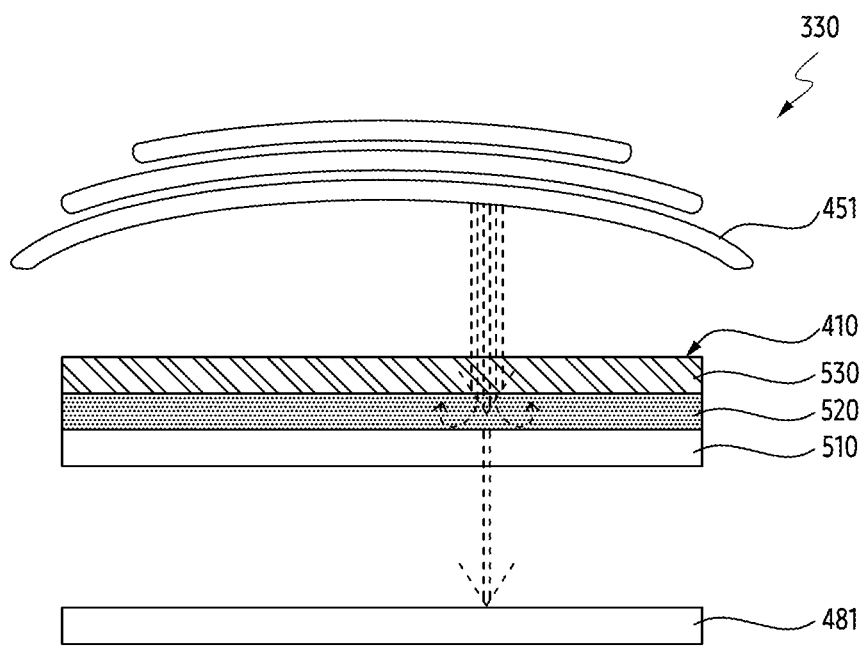
FIG. 5 is a diagram illustrating an example structure of an infrared absorption filter included in a depth camera module of an electronic device according to various embodiments.
Figure 6:
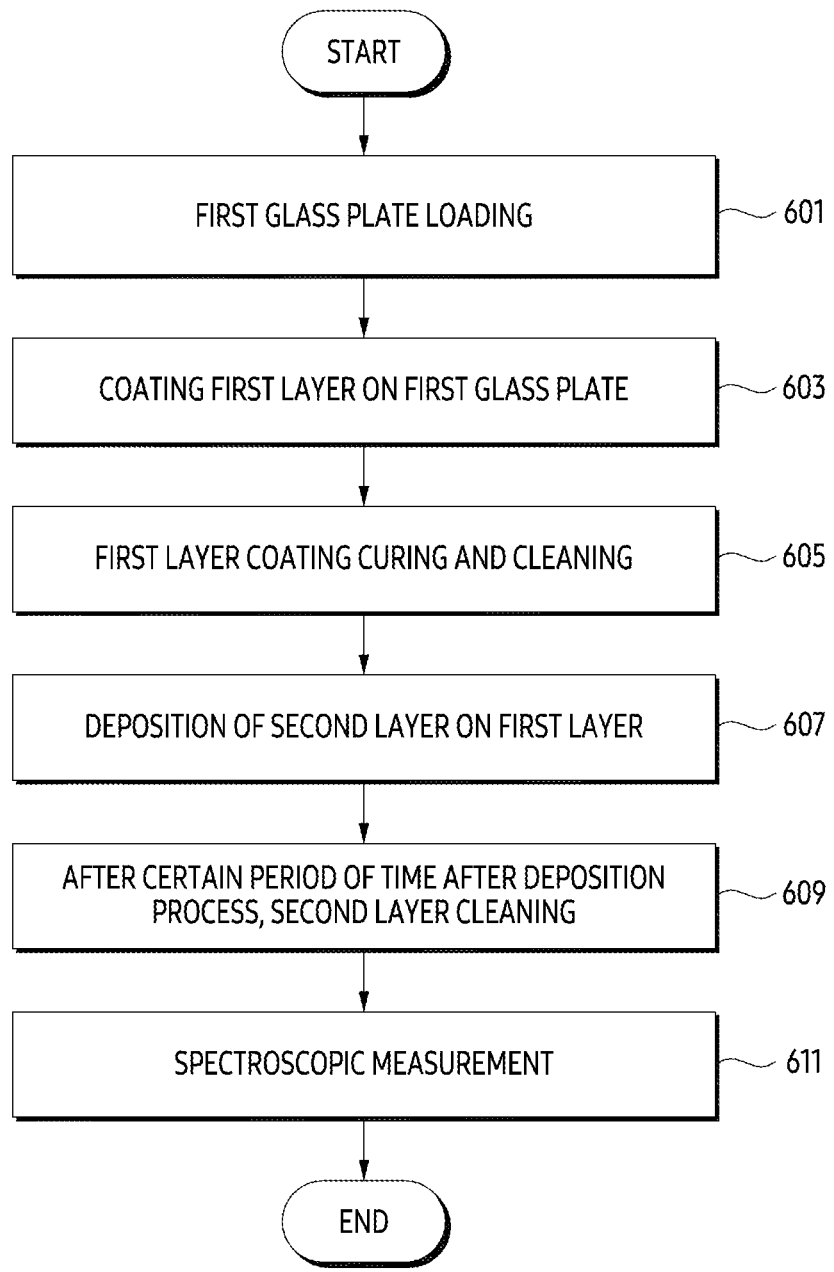
FIG. 6 is a flowchart illustrating an example method of manufacturing an infrared absorption filter included in a depth camera module of an electronic device according to various embodiments.
Figure 7:
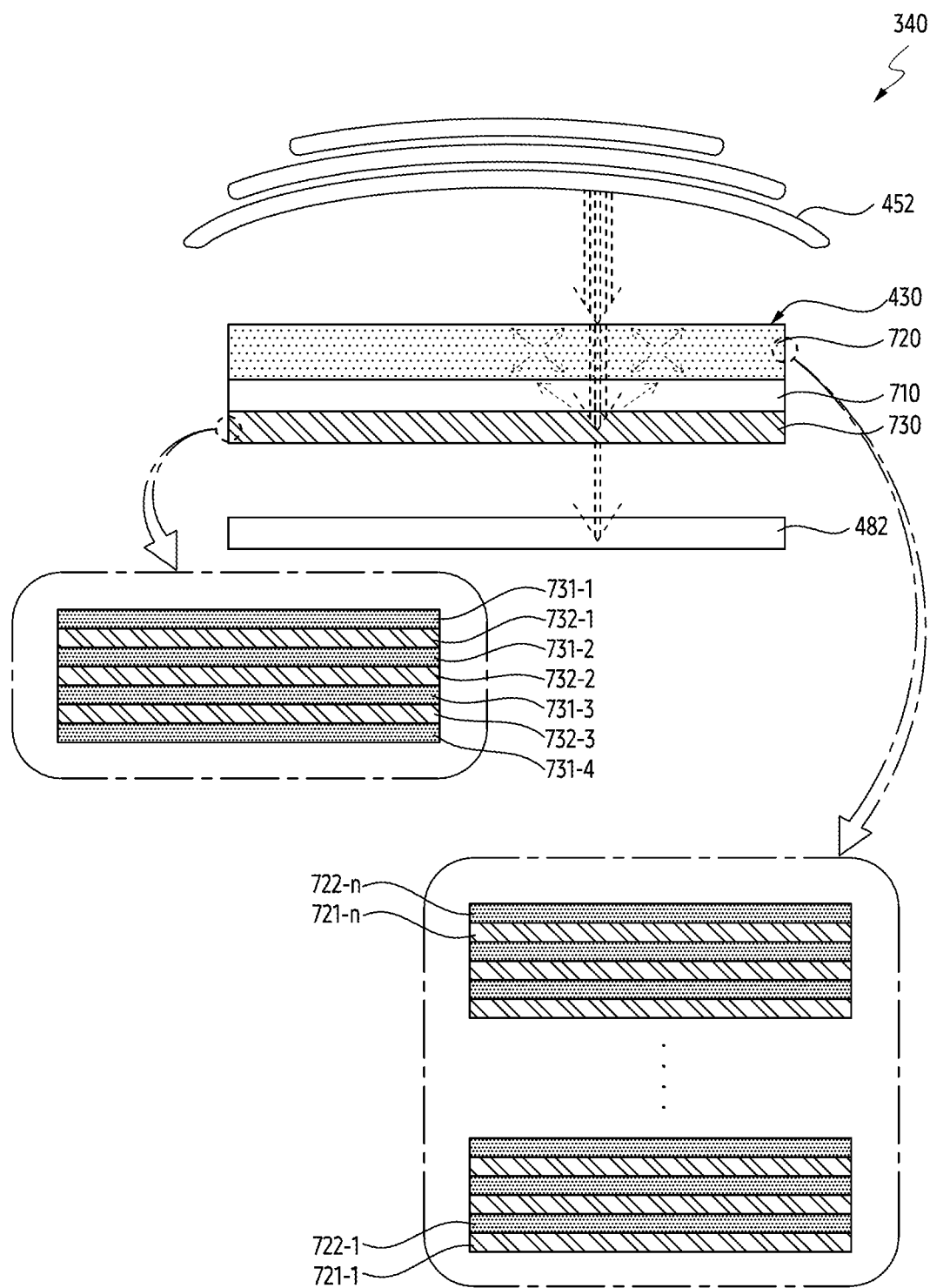
FIG. 7 is a diagram illustrating an example structure of an infrared reflection filter included in a camera module of an electronic device according to various embodiments.
Figure 8:
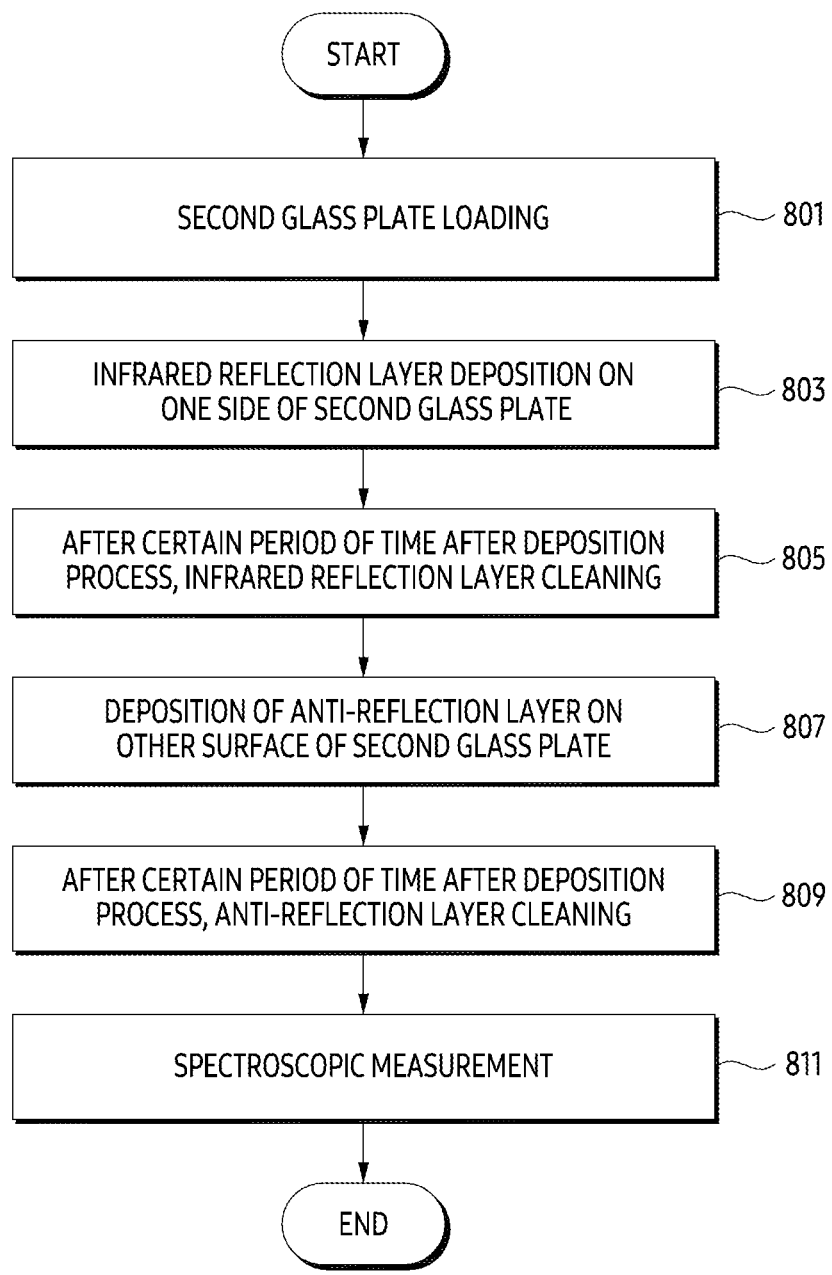
FIG. 8 is a flowchart illustrating an example method of manufacturing an infrared reflection filter included in a camera module of an electronic device, according to various embodiments.

FIG. 5 is a diagram illustrating an example structure of an infrared absorption filter included in a depth camera module of an electronic device according to various embodiments, and FIG. 6 is a flowchart illustrating an example method of manufacturing an infrared absorption filter included in a depth camera module of an electronic device according to various embodiments, and FIG. 7 is a diagram illustrating an example structure of an infrared reflection filter included in a camera module of an electronic device according to various embodiments, and FIG. 8 is a flowchart illustrating an example method of manufacturing an infrared reflection filter included in a camera module of an electronic device according to various embodiments.

Referring to FIGS. 5 and 6, the first filter 410 may include a first glass plate 510, a first layer 520, and a second layer 530. The first glass plate 510 may be formed of a glass material or a film capable of transmitting light. The first glass plate 510 may support the layers 520 and 530 of the first filter 410. The first glass plate 510 may be disposed on the first image sensor 481 (e.g., the first image sensor 481 of FIG. 4).

According to an embodiment, the first layer 520 may be disposed on the first glass plate 510. The first layer 520 may absorb a portion of infrared light among the light transmitted through the first lens assembly 451 (e.g., the first lens assembly 451 of FIG. 4). The first layer 520 may be formed of a single organic layer that absorbs a portion of light in an infrared band. For example, the first layer 520 may include, for example, a diimmonium-based compound as an organic material. However, it is not limited thereto.

The organic material included in the first layer 520 may absorb a portion of infrared light transmitted to the first layer 520. The first layer 520 may transfer the rest of the infrared light transmitted to the first layer 520 except for the light absorbed by the organic material to the first image sensor 481 through the first glass plate 510.

According to an embodiment, the second layer 530 may be disposed on the first layer 520. The second layer 530 may be formed of a single inorganic layer having rigidity. For example, the second layer 530 may include silicon dioxide (SiO2) or titanium dioxide (TiO2). The second layer 530 may protect the first layer 520 by preventing/inhibiting the first layer 520 from being exposed to the outside.

The first filter 410 may serve as an infrared filter by configuring the first layer 520 as a single organic layer and absorbing a portion of infrared rays. Since the first layer 520 may be formed of one organic layer, a process may be simplified compared to a reflective filter formed by stacking a plurality of layers and manufacturing time may be reduced. The manufacturing yield of the first layer 520 may be improved by applying a simplified process.

In order to apply the first layer 520 on the first glass plate 510, the first glass plate 510 may be loaded on a cradle of a spin coater (601). According to an embodiment, the first glass plate 510 may be loaded on a rotatable cradle. For example, the device may be a spin coater for performing spin coating. The spin coater is an application equipment using centrifugal force and may be used to form a uniform thin film. The first glass plate 510 may be disposed on the cradle of the spin coater after cleaning the surface.

The first layer 520 may be coated on one surface of the first glass plate 510 (603). The other surface of the first glass plate 510 may be mounted on a cradle, and a liquid organic material, which is a component of the first layer 520, may be disposed on one surface of the first glass plate 510. The first glass plate 510 may rotate by an operation of the spin coater. For example, the first glass plate 510 supported by the cradle may be rotated by rotating the cradle by driving the spin coater. By rotating the first glass plate 510, the liquid organic material including the component of the first layer 520 may be applied onto the first glass plate 510 as a thin film. The first layer 520 may be disposed on the first glass plate 510 as a single organic thin film.

The first layer 520 applied on the first glass plate 510 may be cured by heat (605). The cured first layer 520 may be adhered to the first glass plate 510. By cleaning the surface of the first layer 520, foreign substances positioned on the first layer 520 may be removed. The first layer 520 may be formed of a material containing an organic material to absorb infrared rays transmitted to the first layer 520, thereby functioning as an infrared filter.

The second layer 530 may be deposited on the first layer 520 (607). The first glass plate 510 to which the first layer 520 is applied may be inserted into the vacuum chamber, and the second layer 530 may be stacked on the first layer 520 through a deposition process. Particles emitted from a target including at least one of Si, Al, Ge, Zr, or Ti, which is an inorganic material of the second layer 530, may be deposited on the first layer 520 to form a thin film. The second layer 530 may be formed as a single deposition layer and may perform a function of protecting the first layer 520.

In operation 609, after a certain time elapses from the time when the deposition process is completed, the foreign material positioned on the second layer 530 may be removed by cleaning the second layer 530. After removing foreign substances, in operation 611, spectral characteristics of the first filter 410 may be measured through a spectrometer. The spectrometer or spectroscopic measuring device may measure the spectroscopy of light transmitted through the first filter 410 and measure the transmittance and reflectance of a specific wavelength band of the first filter 410 by irradiating light to the first filter 410.

Referring to FIGS. 7 and 8, the second filter 430 may include a second glass plate 710, an infrared reflection layer 720, and an antireflection layer 730. The second glass plate 710 may be formed of a glass material or a film capable of transmitting light. The second glass plate 710 may be in contact with the layers 720 and 730 of the second filter 430. The second glass plate 710 may be disposed on the second image sensor 482 (e.g., the second image sensor 482 of FIG. 4).

According to an embodiment, the infrared reflective layer 720 may be disposed on the second glass plate 710. For example, the infrared reflective layer 720 may be disposed between the second glass plate 710 and the second lens assembly 452. The infrared reflection layer 720 may be configured to reflect at least a portion of infrared light among light transmitted to the second filter 430 through the second lens assembly 452. The infrared reflection layer 720 may include layers including an inorganic material. For example, the layers of the infrared reflection layer 720 may be formed of SiO2, SiNx, AlN, AlOxNy, GeO2, Al2O3, ZrO2, TiO2, or a combination thereof.

According to an embodiment, the infrared reflective layer 720 may be formed by alternately stacking layers having a high refractive index and layers having a low refractive index (e.g., about 40 layers deposition). For example, the high refractive layers may include at least one of TiO2, SiNx, GeO2, Al2O3, or ZrO2, and the low refractive layers may include at least one of SiO2, AlN, AlOxNy, GeO2, Al2O3, ZrO2, or TiO2. The high refractive layer and the low refractive layer may have different refractive indices and may be alternately stacked with each other. For example, the high refractive layers including TiO2 may be disposed between the low refractive layers including SiO2. For example, the infrared reflective layer 720 may include a first high refractive layer 721-1 in contact with the second glass plate 710 and an n-th high refractive index layer 721-$n$ and a plurality of high refractive layers disposed between the first high refractive index layer 721-1 and the n-th high refractive index layer 721-$n$. The infrared reflection layer 720 may include a first low refractive layer 722-1 in contact with the first high refractive layer 721-1 and an n-th low refractive layer 722-$n$ and a plurality of low refractive layers disposed between the first low refractive layer 722-1 and the n-th low refractive layer 722-$n$. Each of the low refractive layers (722-1, . . . 722-$n$) may be disposed between the high refractive layers (721-1, . . . 721-$n$). When incident light is incident, the high refractive layers may provide an optical path with a larger refractive angle than the low refractive layers.

According to an embodiment, although it has been described that the first high refractive layer 721-1 is in contact with the second glass plate 710, the present disclosure is not limited thereto, and a low refractive layer may be disposed between the first high refractive layer 721-1 and the second glass plate 710. According to an embodiment, although the n-th low refractive layer 722-$n$ is disposed toward the second lens assembly 452, the present disclosure is not limited thereto, and a high refractive layer may be disposed between the second lens assembly 452 and the n-th low refractive layer 722-$n$.

According to an embodiment, the light transferred to the second filter 430 may be transmitted and reflected on the surfaces of each of the high refractive layers (721-1, . . . 721-$n$) and the low refractive layers (722-1, . . . 722-$n$), and the second filter 430 may adjust the reflectance and transmittance of light transmitted to the second filter 430 in a specific wavelength band by destructively interfering with the light reflected from the surface of each layer. Each of the layers of the high refractive index layers (721-1, . . . 721-$n$) and the low refractive index layers (722-1, . . . 722-$n$) may be formed to have different thicknesses.

According to an embodiment, the anti-reflection layer 730 may be disposed between the second glass plate 710 and the second image sensor 482. A portion of the light transmitted through the second filter 430 may be reflected by the second image sensor 482 to reach the anti-reflection layer 730. The anti-reflection layer 730 may prevent/reduce light reflected from the second image sensor 482 from being reflected back to the second image sensor 482. The antireflection layer 730 may be formed by alternately stacking layers having a high refractive index and layers having a low refractive index (e.g., depositing about 7 layers). For example, the anti-reflection layer 730 may include a plurality of high refractive index layers 731-1, 731-2, 731-3, and 731-4 in contact with the second glass plate 710. The anti-reflection layer 730 may include a plurality of low refractive layers 732-1, 732-2, and 732-3 between a plurality of high refractive layers 731-1, 731-2, 731-4, and 731-4. Each of the low refractive layers (732-1, 732-2, 732-3) may be disposed between the high refractive layers (731-1, 731-2, 731-3, 731-4). When an incident light is incident, the high refractive layers 731-1, 731-2, 731-3, and 731-4 may provide an optical path having a greater refractive angle than the low refractive layers 732-1, 732-2, and 732-3.

According to an embodiment, among the high refractive layers 731-1, 731-2, 731-3, and 731-4, the layer 731-1 may be disposed to contact the second glass plate 710 and the layer 731-4 may be disposed to face the second image sensor 482. The high refractive layer may form outermost layers of the anti-reflection layer 730. The outermost layers of the anti-reflection layer 730 may be a layer disposed on one surface of the anti-reflection layer 730 and a layer disposed on the other surface of the anti-reflection layer 730 facing the one surface. However, the present disclosure is not limited thereto, and some of the low refractive layers 732-1, 732-2, and 732-3 may form outermost layers of the antireflection layer 730. For another example, among the outermost layers of the anti-reflection layer 730, a layer forming one surface of the anti-reflection layer 730 may be formed of a low refractive layer, and a layer forming the other surface of the anti-reflection layer 730 may be formed of a high refractive layer.

For example, the thickness and material of the high refractive layers and the low refractive layers may be appropriately selected to offset light reflected at the interface formed by the layers of the anti-reflection layer 730. For example, the thickness and material of the high refractive layers (731-1, . . . 731-*n*) and the low refractive layers (732-1, . . . 732-*n*) may be appropriately selected to offset light reflected at the interface formed by the layers of the anti-reflection layer 730.

The second glass plate 710 may be loaded into the vacuum chamber (801). In order to deposit the infrared reflective layer 720 and the anti-reflection layer 730 on both surfaces of the second glass plate 710, the second glass plate 710 may be disposed in a vacuum chamber for a deposition process. Before the second glass plate 710 is loaded into the vacuum chamber, foreign substances existing on the surface of the second glass plate 710 may be removed through washing.

The infrared reflection layer 720 may be deposited on one surface of the second glass plate 710 (803). According to an embodiment, in the vacuum chamber, a target including at least one of inorganic materials to be deposited on the second glass plate 710 such as Si, Al, Ge, Zr, or Ti may be disposed toward one surface of the second glass plate 710. Through the deposition process, one of the layers of the infrared reflection layer 720 may be stacked on the second glass plate 710. After a layer contacting one surface of the second glass plate 710 among the layers of the infrared reflection layer 720 is deposited, the surface of the deposited layer may be cleaned, and an additional layer may be deposited on the surface of the cleaned layer. After disposing a target containing a material of an additional layer, through the deposition process, an additional layer may be deposited on the surface of the layer deposited on one surface of the second glass plate 710. After the deposition is completed, foreign substances present on the surface of the additional layer may be removed through cleaning. The above-described operation may be repeated until all of a plurality of layers of the infrared reflection layer 720 are deposited.

After the deposition process is completed, the deposition layer may be disposed at room temperature for a certain time to be stabilized, and a cleaning process may be performed on the infrared reflection layer 720 (805). Through the cleaning process, foreign substances present on the surface of the infrared reflective layer 720 may be removed.

The anti-reflection layer 730 may be deposited on the other surface facing one surface of the second glass plate 710 on which the infrared reflection layer 720 is deposited (807). According to an embodiment, in the vacuum chamber, a target including at least one of inorganic materials to be deposited on the second glass plate 710 such as Si, Al, Ge, Zr, or Ti may be disposed toward the other surface of the second glass plate 710. Through the deposition process, one of the layers of the anti-reflection layer 730 may be stacked on the second glass plate 710. After a layer contacting the other surface of the second glass plate 710 among the layers of the antireflection layer 730 is deposited, the surface of the deposited layer may be cleaned, and an additional layer may be deposited on the surface of the cleaned layer. After disposing a target including a material of the additional layer, the additional layer may be deposited on the surface of the layer deposited on the other surface of the second glass plate 710 through a deposition process. After the deposition is completed, foreign substances present on the surface of the additional layer may be removed through cleaning. The above-described operation may be repeated until all of a plurality of layers of the anti-reflection layer 730 are deposited.

After deposition of the anti-reflection layer 730 is completed, the anti-reflection layer 730 may be disposed at room temperature for a certain time to be stabilized, and a cleaning process may be performed on the antireflection layer 730 (809). Through the cleaning process, foreign substances present on the surface of the anti-reflection layer 730 may be removed.

The spectral characteristics of the second filter 430 may be measured through the spectrometer (811). The spectrometer or spectroscopic measuring device may measure the transmittance and reflectance of a specific wavelength band of the second filter 430 by irradiating light with the second filter 430 and measuring the spectroscopy of light transmitted through the second filter 430.

Referring back to FIGS. 5 and 7, the first filter 410 may absorb a portion of the light in the infrared region among the light transmitted to the first filter 410 through the first layer 520 and filter a wavelength of a specific region, and the second filter 430 may reflect at least a portion of the light in the infrared region among the light transmitted to the second filter 430 through the infrared reflection layer 720 and filter a wavelength of a specific region.

The infrared reflection layer 720 of the second filter 430 may include an infrared reflection layer 720 formed of more layers than the first layer 520 of the first filter 410 that performs a function of filtering a portion of infrared rays. The anti-reflection layer 730 of the second filter 430 may be formed a plurality of layers to prevent/reduce the reflected light reflected from the second image sensor 482 from being reflected again.

According to the above-described embodiment, since a filter (e.g., the second filter 430) included in the second camera module 340 (e.g., the second camera module 340 of FIG. 3) which is the wide camera or the third camera module 350 (e.g., the third camera module 350 of FIG. 3) which is the ultra-wide camera has a plurality of deposition layers to improve transmittance and reflectance characteristics, the second camera module 340 and the third camera module 350 may have enhanced sharpness or enhanced image quality performance. The first camera module 330 may include a first filter 410 having a lower transmittance characteristic than the second filter 430 since only sharpness for extracting depth information is required in order to implement an out-focus effect.

When many deposition layers are deposited, such as the second filter 430, the tact-time may increase, the defect rate may increase due to the inclusion of foreign substances according to the increase in the process, and the increase in the material cost may cause an increase in the overall process cost.

The first filter 410 may be configured to include layers to have transmittance and reflectance sufficient to extract depth information. The first filter 410 may reduce a deposition process of layers, thereby reducing a tact time; and simplify the process, thereby reducing the defect rate; and reduce the material cost, thereby reducing the overall process cost.

Figure 9:
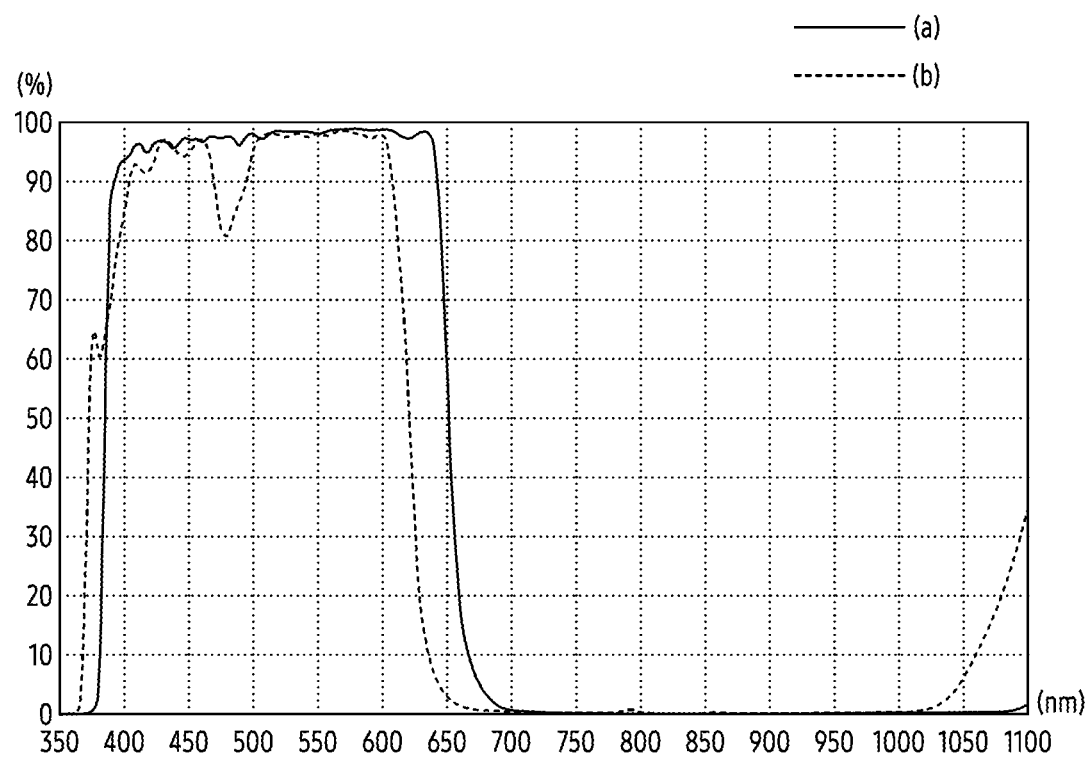
FIG. 9 is a graph illustrating transmittance of an infrared reflection filter included in a camera module of an electronic device according to various embodiments.

FIG. 9 is a graph illustrating transmittance of an infrared reflection filter included in a camera module of an electronic device according to various embodiments.

Referring to FIG. 9, the line (a) represents transmittance according to the wavelength of the light when light is vertically incident on the second filter 430 (e.g., the second filter 430 of FIG. 4), which is an infrared reflection filter. The line (b) represents transmittance according to the wavelength of the light when the incident angle of light incident on the second filter 430 is 30 degrees.

Referring to line (a), the second filter 430 may have a transmittance of 90% or more in the visible light band (400 to 630 nm) among light vertically incident to the second filter 430, and a blocking rate of 90% or more in the infrared band (700 to 1000 nm).

The second filter 430 having the transmittance and blocking rate as described above may block an unnecessary region (e.g., an infrared region) in order to express a color similar to a color recognized visually.

Referring to line (b), among the light incident on the second filter 430 with an incident angle of 30 degrees, a visible light band transmitted may be shifted by about −30 nm. For example, based on the cut-off 50% band, the second filter 430 may have a transmittance of 50% at a point of approximately 650 nm in line (a), but may have a transmittance of 50% at a point of approximately 620 nm in line (b). The second filter 430 may reflect most of the light in the infrared band and thus visually red.

In the case of the second filter 430, since the transmittance characteristic changes according to the incident angle, when the second filter 430 is applied to the first camera module 330, an error may occur in calculating depth information. For example, since the transmittance characteristic changes according to the incident angle, when a composite light source or diffuse reflection occurs, an error in depth information may worsen.

According to an embodiment, a filter applied to the second camera module 340 may use a filter independent of a change in a direction of incident light, such as the first filter 420 in addition to the second filter 430. Even if the transmission amount is the same regardless of the direction of the light incident to the second camera module 340, the filter applied to the second camera module 340 may be configured to have a transmittance of 90% or more in the visible light band 400 to 630 nm and a blocking rate of 90% or more in the infrared band 700 to 1000 nm.

Figure 10:
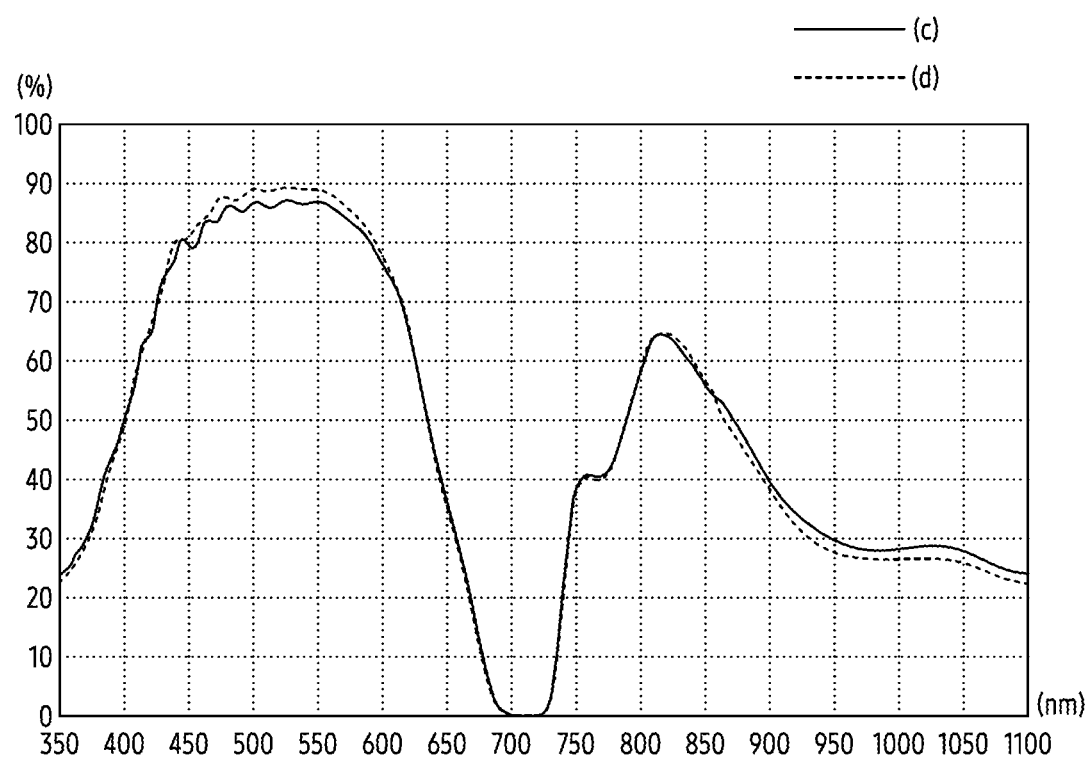
FIG. 10 is a graph illustrating transmittance of an infrared absorption filter included in a camera module of an electronic device according to various embodiments.

FIG. 10 is a graph illustrating transmittance of an infrared absorption filter included in a camera module of an electronic device according to various embodiments.

Referring to FIG. 10, since the first camera module 330 is a depth camera module, it may be used only for extracting depth information, which is a designated function, and thus, the high transmittance of the visible light band and the high reflectance of the infrared band are not required as shown in the graph of FIG. 9; and transmittance and reflectance of performance sufficient to be used for extracting depth information may be required. Accordingly, as illustrated in FIG. 6, the first filter in which the first layer (e.g., the first layer 520 of FIG. 5) is formed of one deposition layer may secure performance to obtain depth information.

Line (c) indicates transmittance according to the wavelength of light when light is vertically incident on the first filter 410 (e.g., the first filter 410 of FIG. 4), which is an infrared absorption filter. Line (d) indicates transmittance according to the wavelength of the light when the incident angle of the light incident on the first filter 410 is 30 degrees.

Looking at line (c) and line (d), more than 40% of the light in the 750 nm to 900 nm band transmitted through the first lens assembly may be transmitted, more than 80% of the light in the visible light band 450 nm to 600 nm may be transmitted, and more than 90% of the light in the near-infrared band 700 nm to 750 nm may be blocked. The first filter 410 absorb only a part of the light in the infrared band and may visually be green or blue.

According to an embodiment, the light incident on the first filter 410 may hardly change the transmittance characteristics according to the incident angle. For example, the distribution of light on the visible light band among the transmitted light transmitted through the first filter 410 may be maintained independently of the change in the direction of the incident light to the first filter 410. The distribution of light on the visible light band among the transmitted light transmitted through the second filter 430 may be changed as the direction of the incident light to the second filter 430 is changed.

According to an embodiment, the first camera module 330 for obtaining depth information may include a first filter 410 having less change in transmittance characteristics according to an incident angle of light than the second filter 430 having a high transmittance of a visible light band and a high blocking rate of an infrared band.

According to the above-described embodiment, the electronic device (e.g., the electronic device 101 of FIG. 1) may perform a function necessary for the camera module while simplifying a manufacturing cost or a manufacturing process, since filters of the first camera module 330 and the second camera module 340 are different from each other. The first filter 410 may lower the defect rate due to foreign substances than the second filter 430 formed of a plurality of deposition layers through simplification of the process.

Figure 11:
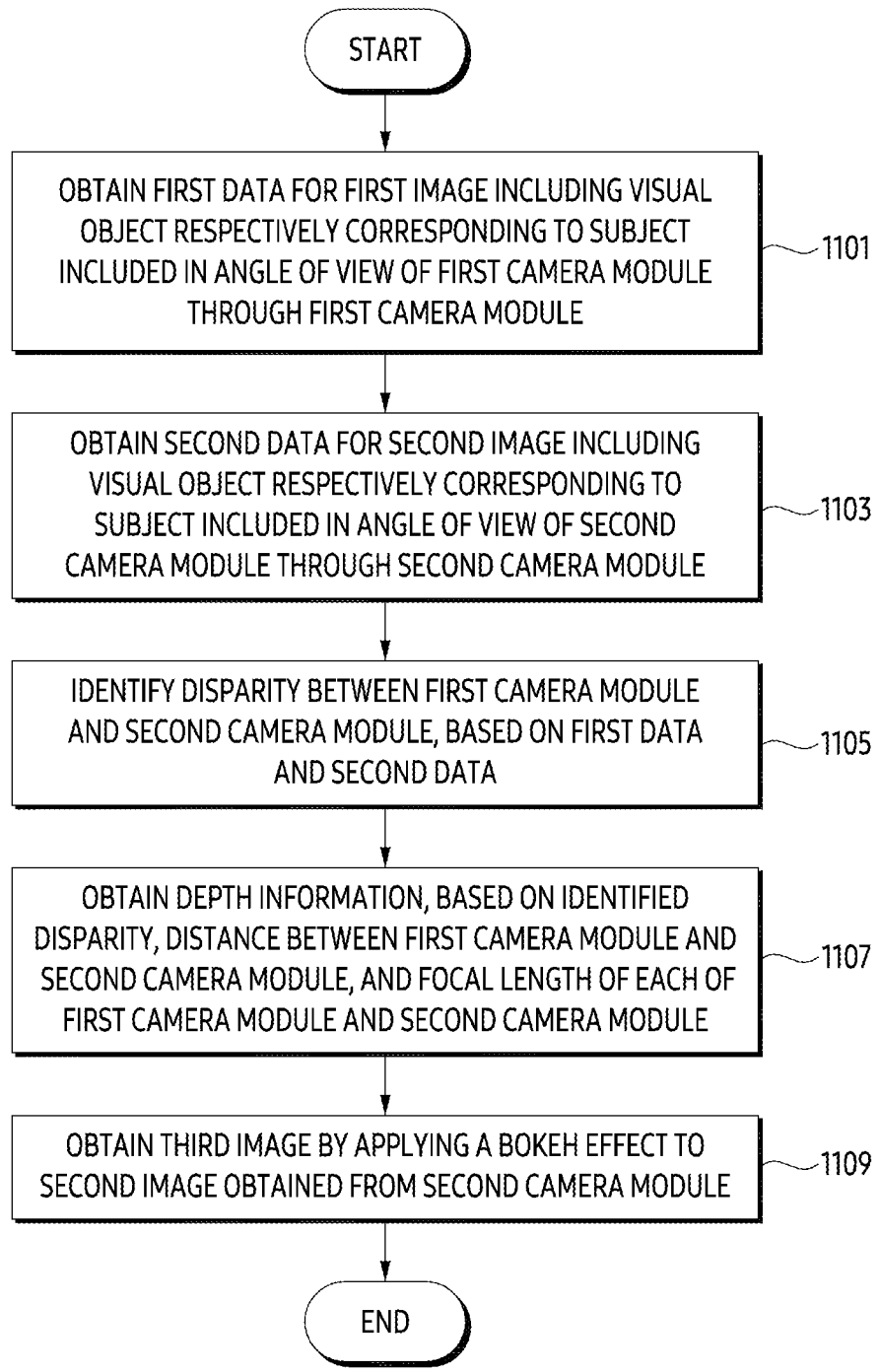
FIG. 11 is a flowchart illustrating an example method of obtaining an image having an out-focus effect, according to various embodiments.
Figure 12A:
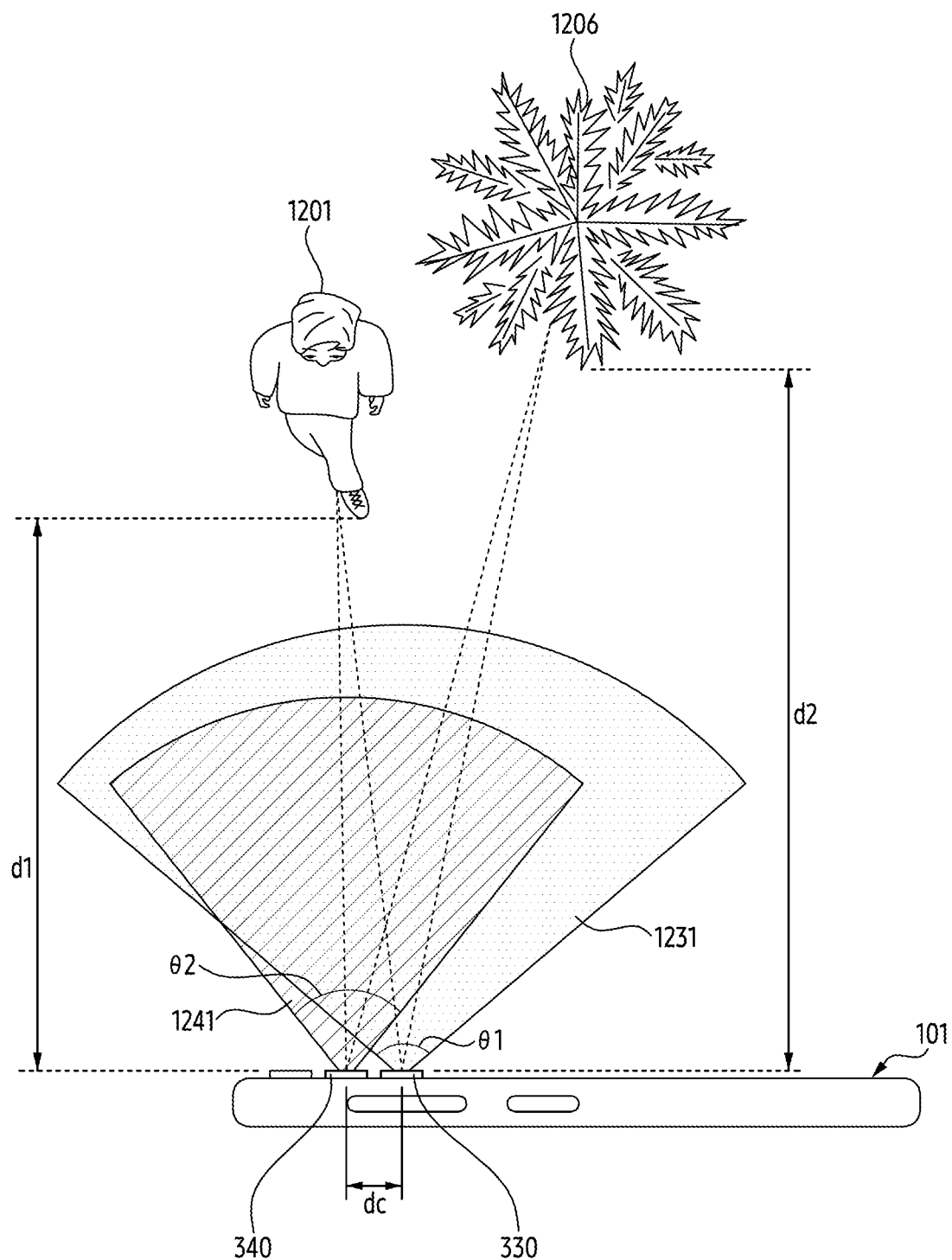
FIGS. 12A and 12B are diagrams illustrating an example of a method of obtaining depth information using an electronic device, according to various embodiments.
Figure 12B:
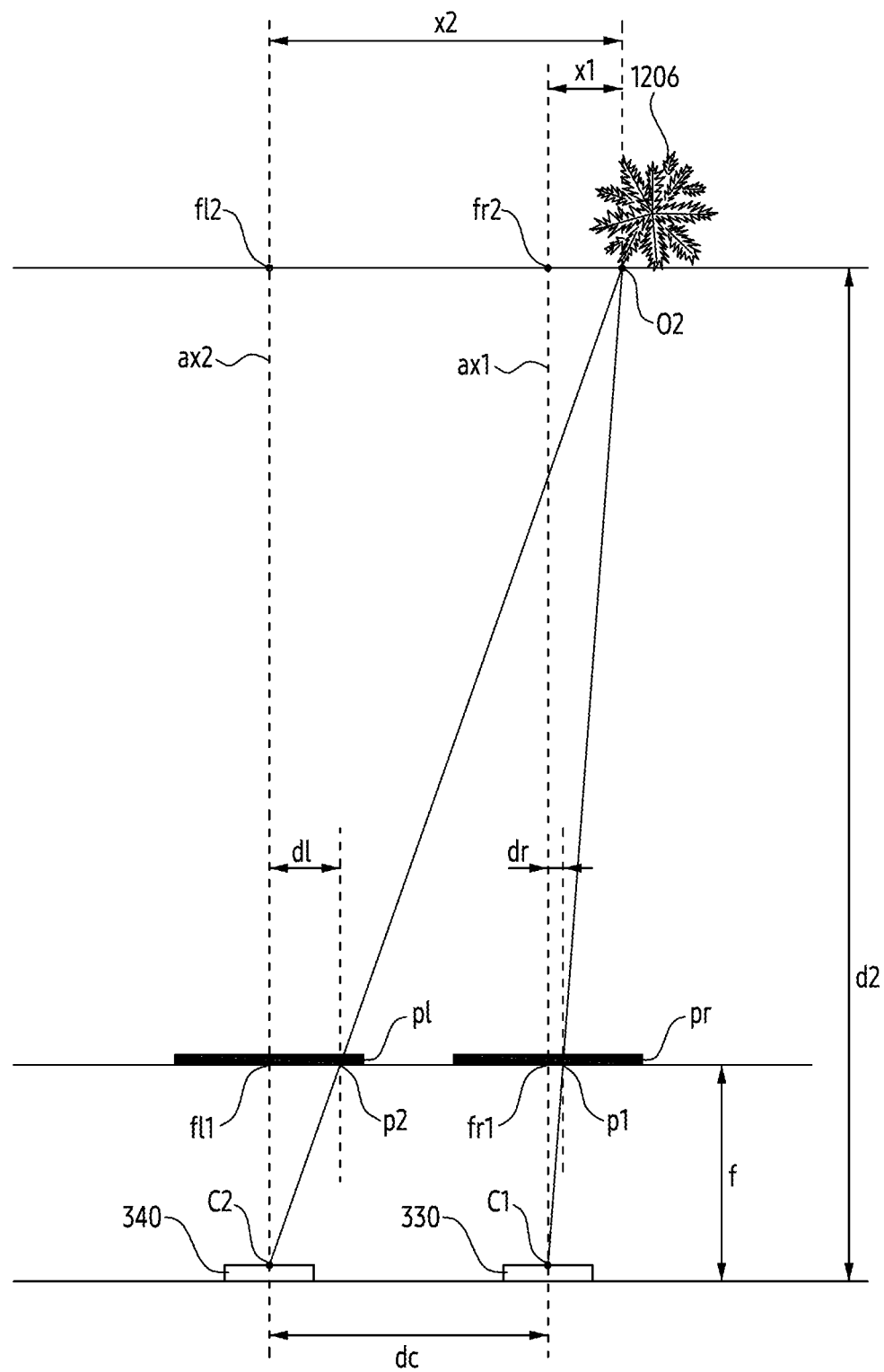
Figure 13:
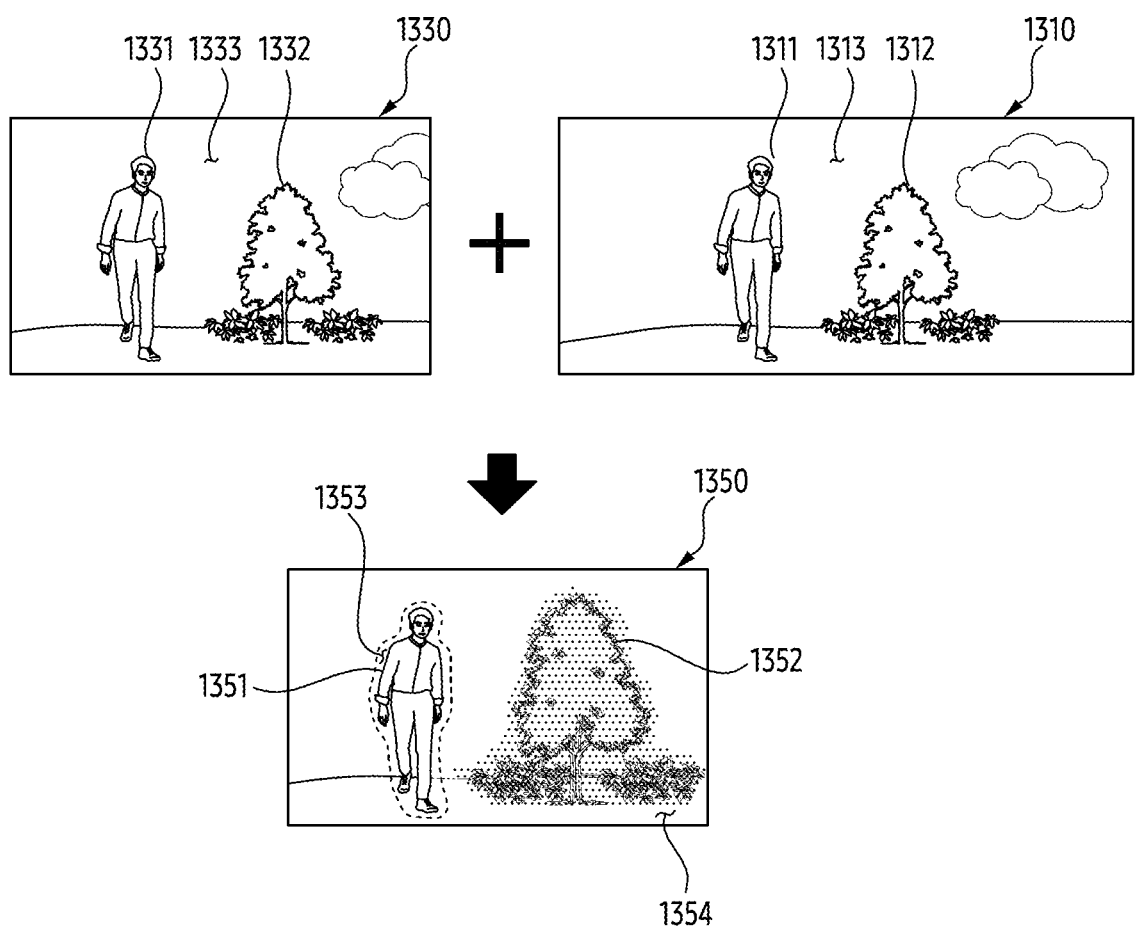

FIG. 11 is a flowchart illustrating an example method of obtaining an image having an out-focus effect, according to various embodiments, FIGS. 12A and 12B diagrams illustrating an example method of obtaining depth information using an electronic device, according to various embodiments, and FIG. 13 is a diagram illustrating an example of obtaining an image having an out-focus effect from a plurality of images obtained from a plurality of camera modules using an electronic device according to various embodiments.

Referring to FIGS. 11, 12A, 12B, and 13, in operation 1101, the processor 120 may obtain first data on the first image 1310 including visual objects 1311 and 1312 corresponding to the subjects 1201 and 1206 included in the angle of view 1231 Θ1 of the first camera module 330 through the first camera module 330. In an embodiment, the first image 1310 may further include background 1313 as well as visual objects 1311 and 1312 corresponding to the subjects 1101 and 1106, respectively.

In operation 1103, through the second camera module 340, the processor 120 may obtain second data on the second image 1330 including visual objects 1331 and 1332 corresponding to the subjects 1201 and 1206 included in the angle of view 1241 Θ2 of the second camera module 340, respectively. In an embodiment, the second image 1330 may further include a background 1333 as well as visual objects 1331 and 1332 corresponding to the subjects 1201 and 1206, respectively. The first camera module 330 may include a depth camera, and the second camera module 340 may include a wide-angle camera. In an embodiment, the angle of view Θ1 of the first camera module 330 may be greater than the angle of view Θ2 of the second camera module 340. The angle of view Θ2 of the second camera module 340 may at least partially overlap the angle of view Θ1 of the first camera module 330. For example, the angle of view Θ2 of the second camera module 340 may completely overlap the angle of view Θ1 of the first camera module 330. For example, an area photographed using the first camera module 330 may include an area photographed using the second camera module 340. For example, visual objects corresponding to each of the subjects in the image obtained using the second camera module 340 may be included in the image obtained using the first camera module 330.

In operation 1105, the processor 120 may identify a disparity between the first camera module 330 and the second camera module 340 with respect to the external object, based on the first data on the first image 1310 and the second data on the second image 1330.

Referring to FIGS. 12A and 12B, in order to identify the disparity, the processor 120 may obtain a first image plane pr located at a focal length of the first camera module 330 from the first camera module 330 and obtain a second image plane pl located at a focal length of the second camera module 340 from the second camera module 340. The image plane may be a virtual plane obtained through a camera by projecting points or regions of 3D spaces. The image plane may be formed at a position spaced apart from the camera lens by a focal length. The image plane may be a plane in which an image is formed through a lens of a camera.

Through the first camera module 330 and the second camera module 340, the disparity may be calculated based on a distance dr between a position p1 on the first image plane pr corresponding to one point O2 of the external object such as the second subject 1206 located in the 3D spaces and the optical axis of the first camera module 330 and a distance d1 between a position p2 on the second image plane pl corresponding to one point O2 of the external object such as the second subject 1206 located in the 3D space and the optical axis of the second camera module 340. The disparity may be calculated by the processor 120 by a designated algorithm. For example, the disparity may be a difference between a distance dr between a position p1 on the first image plane pr corresponding to one point O2 of the external object and the optical axis of the first camera module 330 and a distance d1 between a position p2 on the second image plane pl corresponding to one point O2 of the external object and the optical axis of the second camera module 340, and the processor 120 may calculate a distance d1 and a distance dr from the first data and the second data, and may identify a disparity corresponding to a difference between the distance d1 and the distance dr based on the calculated distance d1 and the distance dr.

In operation 1107, the processor 120 may obtain depth information of the first external object 1201 and depth information of the second external object 1206, based on the identified disparity, a distance between the first camera module 330 and the second camera module 340, and a focal length of each of the first camera module 330 and the second camera module 340. The focal length of the first camera module 330 may be a distance between the first image plane pr of the first camera module 330 and the lens of the first camera module 330, and the focal length of the second camera module 340 may be a distance between the second image plane pl and the lens of the second camera module 340. The distance between the first camera module 330 and the second camera module 340 may be a distance dc between the optical axis ax1 of the lens of the first camera module 330 and the optical axis ax2 of the lens of the second camera module 340. The focal length of the first camera module 330 and the focal length of the second camera module 340 are indicated as being the same as distance f, but are not limited thereto, and the focal length of the first camera module 330 may be different from the focal length of the second camera module 340.

The processor 120 may obtain distance information to an external object using data related to the focal length f of the first camera module 330 and the second camera module 340, the distance dc between the first camera module 330 and the second camera module 340, and the disparity dl–dr or dr–dr of the first camera module 330 and the second camera module 340.

The data related to disparity of the first camera module 330 and the second camera module 340 may include the position p1 on the first image plane pr corresponding to a point O2 of the external object, the distance dr between the optical axes of the first camera module 330, the position p2 on the second image plane pl corresponding to one point O2 of the external object, the distance d1 between the optical axes of the second camera module 340, and the calculated disparity of the first camera module 330 and the second camera module 340.

In order to obtain information related to the distance d1 between the electronic device 101 and the first external object 1201 or information related to the distance d2 between the electronic device 101 and the second external object 1206, the processor 120 may perform an operation including the following contents using the first camera module 330 and the second camera module 340.

When the process of obtaining distance information between the electronic device 101 and the second external object 1206 is exemplarily described, a triangle formed by one point O2 of the second external object 1206 and the point fr2 where the line, from the point O2, parallel to the line connecting the first camera module 330 and the second camera module 340 meets the optical axis ax1 of the first camera module 330 and the center c1 of the lens of the first camera module 330 may be similar to a triangle formed by the point fr1 at which the first image plane pr meets the optical axis of the first camera module 330, the position p1 on the first image plane pr corresponding to one point O2 of the second external object 1206 and the center c1 of the lens of the first camera module 330.

A triangle formed by one point O2 of the second external object 1206 and the point fr2 where the line, from the point O2, parallel to the line connecting the first camera module 330 and the second camera module 340 meets the optical axis ax2 of the second camera module 340 and the center c2 of the lens of the second camera module 340 may be similar to a triangle formed by the point fr2 at which the second image plane pl meets the optical axis of the second camera module 340, the position p2 on the second image plane pl corresponding to one point O2 of the second external object 1206 and the center c2 of the lens of the second camera module 340.

According to the similarity relationship, a ratio of the distance x1 (x1: distance from the point fr2 where a line extending from one point O2 of the external object to be parallel to a line connecting the first camera module 330 and the second camera module 340 and the optical axis of the first camera module 330 meet to one point O2 of the external object) to the distance d2 (d2: distance between a line connecting the first camera module 330 and the second camera module 340 and a point O2 of an external object) may be the same as a ratio of the distance dr (dr: distance between a position p1 on the first image plane pr corresponding to one point O2 of the external object and a point fr1 at which the first image plane pr and the optical axis of the first camera module 330 meet) to the focal length f of the first camera module 330. The above-described relationship may be represented by Equation $x1/d2=dr/f$.

A ratio of the distance x2 (x2: distance from the point fl2 where a line extending from one point O2 of the external object to be parallel to a line connecting the first camera module 330 and the second camera module 340 and the optical axis of the second camera module 340 meet to one point O2 of the external object) to the distance d2 (d2: distance between a line connecting the first camera module 330 and the second camera module 340 and a point O2 of an external object) may be the same as a ratio of the distance d1 (d1: distance between a position p2 on the second image plane pl corresponding to one point O2 of the external object and a point fl1 at which the second image plane pl and the optical axis ax2 of the second camera module 340 meet) to the focal length f of the second camera module 340. The distance x2 may be a difference between the distance x1 and the distance dc between the lens center points of the first camera module 330 and the second camera module 340. The above-described relationship may be represented by Equation $(x1-dc)/d2=d1/f$. The processor 120 may obtain information related to the distance d2 between the second external object 1206 and the camera module using equations $x1/d2=dr/f$ and $(x1-dc)/d2=d1/f$ based on the distance d1, distance dr, and focal distance f.

In a method similar to the above-described method, the processor 120 may obtain information related to the distance d1 between the first external object 1201 and the camera module. The processor 120 may identify a distance from each of the subjects 1201 and 1206 included in both the first image 1310 and the second image 1330 to the electronic device 101. The processor 120 may obtain depth information including data on distance d1 and data on distance d2. The depth information may be referred to as a depth library.

In operation 1109, the processor 120 may obtain information on the third image 1350 by applying a bokeh effect to the second image 1330 obtained from the second camera module 340.

For example, the processor 120 may generate a depth library based on the calculated depth information on the image obtained from the second camera module 340. The depth library may include depth information between subjects located on an image and an electronic device.

The visual object in the third image 1350 may be focused on at least one visual object in the third image 1350. For example, processor 120 may identify a visual object to be focused on by input. When the visual object 1331 on the second image 1330 is selected through a user's input or an input by a system command, the processor 120 may generate a third image 1350 by applying a bokeh effect to the image 1330. The user input may be an operation in which the user selects the visual object 1331 on an image displayed on the display. The input by the system command may be an operation in which the processor 120 analyzes the second image 1330, detects that it is a designated object (e.g., a person or document), and selects the designated visual object 1331. The visual object 1351 of the third image 1350 corresponding to the selected visual object 1331 may be focused on another visual object 1352. For example, the third image 1350 may focus on the area 1353 including the visual object 1351 and blur the rest area 1354 to apply an out-focus effect or a bokeh effect. According to an embodiment, the third image 1350 may maintain the area 1353 including the visual object 1351 as the original image, and different effects may be applied to an area distinguished from the area 1353 including the visual object 1351.

The processor 120 may provide an effect other than an out-focus effect to an area distinguished from the area 1353 including the visual object 1351 through an input. The input may be not only an input provided from the outside, but also a signal transmitted to the processor 120 or a signal generated by the processor 120. According to an embodiment, the processor 120 may apply an effect different from the original image, such as implementing an application effect of a color filter in an area distinguished from the area 1353 including the visual object 1351, changing an out-focus effect, or applying a rotation effect.

According to the above-described embodiment, the electronic device 101 may apply an out-focus effect to an image obtained through the second camera module 340 by obtaining depth information from the first camera module 330 including a first filter (e.g., the first filter 410 of FIG. 4) and used only for depth information extraction and the second camera module 340 used for depth information extraction and image data obtainment.

According to an example embodiment, the electronic device (e.g., the electronic device 101 of FIG. 1) may comprise: a processor; a first camera module (e.g., the first camera module 330 of FIG. 4) comprising a camera including a first lens assembly (e.g., the first lens assembly 451 of FIG. 4) having a first field of view (FOV) and a second camera module comprising a camera (e.g., the second camera module 340 of FIG. 4) spaced apart a first camera module and including a second lens assembly (e.g., the second lens assembly 452 of FIG. 4) having a second FOV that is narrower than the first FOV; wherein the first camera module includes a first image sensor (e.g., the first image sensor 481 of FIG. 4) and a first filter (e.g., the first filter 410 of FIG. 4) including: a first glass plate spaced apart from the image sensor and disposed on the image sensor, and a first layer disposed on the glass plate (e.g., the first layer 520 of FIG. 5) configured to absorb a portion of infrared light among the light transmitted through the first lens assembly (e.g., the first glass plate 510 of FIG. 5), wherein the processor is configured to obtain depth information about a subject located within the second FOV based on data about the light passing through the filter, which is acquired through the image sensor.

According to an example embodiment, the electronic device may further comprise: a second layer (e.g., the second layer 530 of FIG. 5) distinct from the first layer (e.g., the first layer 520 of FIG. 5), wherein the first layer is configured as a single organic layer configured to absorb a portion of light of the infrared band, and wherein the second layer is configured as a single inorganic layer having rigidity.

According to an example embodiment, the second camera module may include a second image sensor (e.g., the second image sensor 482 of FIG. 4) distinct from the first image sensor (e.g., the first image sensor 481 of FIG. 4); and a second filter distinct from the first filter, including a second glass plate (e.g., the second glass plate 710 of FIG. 7) distinct from the first glass plate (e.g., the first glass plate 510 of FIG. 5) spaced apart the second image sensor, and disposed on the second image sensor, an anti-reflection layer (e.g., the anti-reflection layer 730 of FIG. 7) disposed between the second glass plate and the second image sensor, and an infrared reflection filter (e.g., the infrared reflection layer 720 of FIG. 7) disposed on the second glass plate. According to an example embodiment, the anti-reflection layer and the infrared reflection layer may include a plurality of inorganic layers in which a low refractive layer and a high refractive layer are alternately disposed.

According to an example embodiment, the infrared reflection layer in the second filter may be configured to reflect at least a portion of infrared light among the light transmitted through the second lens assembly and a color of the first filter may be different from a color of the second filter by a difference between an amount of infrared light contained in the light that has passed through the first filter and an amount of infrared light contained within the light that has passed through the second filter.

According to an example embodiment, the electronic device may further comprise: a display (e.g., the display 320 of FIG. 3) wherein one surface of the display faces the first image sensor and the second image sensor, the first lens assembly may include fewer lenses than the second lens assembly and a distance (e.g., distance h1 of FIG. 4) between the display and the first image sensor may be greater than a distance (e.g., distance h2 of FIG. 4) between the display and the second image sensor.

According to an example embodiment, the first filter may be configured to transmit at least 40% of the light in the 750 nm to 900 nm band that has passed through the first lens assembly.

According to an example embodiment, the second filter may be configured to block 90% or more of the light in the 750 nm to 900 nm band transmitted through the second lens assembly.

According to an example embodiment, a distribution of light in the visible ray band among transmitted light passing through the first filter may be maintained independent of a change in direction of incident light to the first filter.

According to an example embodiment, the first layer may include a diimmonium-based compound and the second layer may include silicon dioxide (SiO2) or titanium dioxide (TiO2).

According to an example embodiment, the processor may be configured to obtain data for a monochromatic image through the image sensor.

According to an example embodiment, the second FOV may overlap at least partially the first FOV.

According to an example embodiment, the electronic device may further comprise: a camera window including a first transparent portion disposed on the first lens assembly, a second transparent portion spaced apart the first transparent portion and disposed on the second lens assembly, and an opaque area between the first transparent area and the second transparent area; the first camera module disposed in a first camera housing including an opening formed so that at least a portion of the first lens assembly is exposed toward the first transparent area and the second camera module disposed in a second housing including an opening formed so that at least a portion of the second assembly is exposed toward the transparent area.

According to an example embodiment, the processor may be configured to: obtain a first data for an image (e.g., the first image 1310 of FIG. 13) including a visual object corresponding to the subject through the first camera module, obtain a second data for an image (e.g., the second image 1330 of FIG. 13) including a visual object corresponding to the subject through the second camera module, identify a disparity between the first camera module and the second camera module, based on the first data and the second data, obtain depth information based on the identified disparity, a distance (e.g., distance dc of FIG. 12B) between the first camera module and the second camera module, and a focal length (e.g., focal length f of FIG. 12B) of the first camera module and the second camera module, respectively.

According to an example embodiment, the processor may be configured to: obtain a second image by applying a bokeh effect to the first image obtained from the second camera module based on the depth information, and the visual object in the second image (e.g., the third image 1350 of FIG. 13) may be focused relative to at least one visual object in the second image.

According to an example embodiment, an electronic device may comprise: a housing (e.g., the housing 310 of FIG. 3); an image sensor (e.g., the first image sensor 481 of FIG. 4) disposed within the housing toward one surface of the housing; a lens assembly (e.g., the first lens assembly 451 of FIG. 4) including at least one lens exposed through an opening formed on the housing; a glass plate (e.g., the first glass plate 510 of FIG. 5) disposed within a housing spaced apart from the image sensor and disposed on the image sensor; a first layer (e.g., the first layer 520 of FIG. 5) comprising a single organic material layer configured to absorb a portion of infrared light among the light transmitted through the lens assembly and disposed on the glass plate; a second layer (e.g., the second layer 530 of FIG. 5) including a single inorganic material layer having rigidity, configured to protect the first layer, and disposed on the first layer; and a processor (e.g., the processor 120 of FIG. 1) configured to obtain a depth information on the subject in an image obtained by another image sensor distinct from the image sensor, based on data about light passing through a filter configured as a glass plate, the first layer and the second layer through the image sensor, the data obtained through the image sensor.

According to an example embodiment, the first layer may include a diimmonium-based compound and the second layer may include silicon dioxide (SiO2) or titanium dioxide (TiO2).

According to an example embodiment, a distribution of light in the visible ray band among transmitted light passing through the first layer may be maintained independent of a change in direction of incident light to the first filter.

According to an example embodiment, the processor may be configured to obtain data for a monochromatic image through the image sensor.

According to an example embodiment, the filter may be visible in green, by absorbing infrared light.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor #20) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a first camera module including a first lens assembly having a first field of view (FOV); and
a second camera module spaced apart from the first camera module and including a second lens assembly having a second FOV that is narrower than the first FOV;
wherein the first camera module further includes a first image sensor and a first filter between the first image sensor and the first lens assembly, including a first glass plate spaced apart from the first image sensor and a first layer disposed on the first glass plate and configured to absorb a portion of infrared light among light transmitted through the first lens assembly, wherein the second camera module further includes a second image sensor, a second filter including a second glass plate spaced apart from the second image sensor and disposed on the second image sensor, an anti-reflection layer disposed between the second glass plate and the second image sensor, and an infrared reflection layer disposed on the second glass plate, wherein the anti-reflection layer and the infrared reflection layer include a plurality of inorganic layers, wherein the plurality of inorganic layer includes a low refractive layer and a high refractive layer alternately stacked, and a processor configured to obtain depth information about a subject located within the second FOV based on data about the light passing through the first filter, which is acquired through the first image sensor.

2. The electronic device of claim 1, wherein:
the first camera module further includes a second layer distinct from the first layer,
the first layer includes a single organic layer configured to absorb a portion of light of the infrared band, and
the second layer includes a single inorganic layer having rigidity.

3. The electronic device of claim 1, wherein the infrared reflection layer in the second filter is configured to reflect at least a portion of infrared light among the light transmitted through the second lens assembly, and
wherein a color of the first filter is different from a color of the second filter based on a difference between amount of infrared light contained in the light passed through the first filter and the amount of infrared light contained within the light passed through the second filter.

4. The electronic device of claim 1, further comprising: a display having one surface facing the first image sensor and the second image sensor,
wherein the first lens assembly includes fewer lenses than the second lens assembly, and
wherein a distance between the display and the first image sensor is greater than a distance between the display and the second image sensor.

5. The electronic device of claim 1, wherein the first filter is configured to transmit at least 40% of light in the 750 nm to 900 nm band passed through the first lens assembly.

6. The electronic device of claim 1, wherein the second filter is configured to block 90% or more of light in the 750 nm to 900 nm band transmitted through the second lens assembly.

7. The electronic device of claim 6, wherein a distribution of light in a visible ray band among transmitted light passing through the first filter is maintained independent of a change in direction of incident light to the first filter.

8. The electronic device of claim 2, wherein the first layer includes a diimmonium-based compound and wherein the second layer includes silicon dioxide ($SiO_2$) or titanium dioxide ($TiO_2$).

9. The electronic device of claim 1, wherein the processor is configured to obtain data for a monochromatic image through the image sensor.

10. The electronic device of claim 1, wherein the second FOV overlaps, at least partially, the first FOV.

11. The electronic device of claim 1, further comprising:
a camera window including a first transparent portion disposed on the first lens assembly, a second transparent portion spaced apart from the first transparent portion and disposed on the second lens assembly, and an opaque area between the first transparent area and the second transparent area;
wherein the first camera module is disposed in a first camera housing including an opening formed so that at least a portion of the first lens assembly is exposed toward the first transparent area and
wherein the second camera module disposed in a second housing including an opening formed so that at least a portion of the second lens assembly is exposed toward the transparent area.

12. The electronic device of claim 1, wherein the processor is configured to:
obtain a first data for an image including a visual object corresponding to the subject through the first camera module,
obtain a second data for an image including a visual object corresponding to the subject through the second camera module,
identify a disparity between the first camera module and the second camera module, based on the first data and the second data, and
obtain the depth information based on the identified disparity, a distance between the first camera module and the second camera module, and focal length of the first camera module and the second camera module, respectively.

13. The electronic device of claim 12, wherein the processor is configured to obtain a second image by applying a bokeh effect to the first image obtained from the second camera module based on the depth information, and
wherein the visual object in the second image, is focused relative to at least one visual object in the second image.

14. An electronic device comprising:
a housing;
a first image sensor and a second image sensor spaced apart from the first image sensor disposed within the housing toward one surface of the housing;
a first lens assembly including at least one lens exposed through an opening formed on the housing and arranged to the first image sensor;
a first glass plate spaced apart from the first image sensor and disposed between the first image sensor and the first lens assembly;
a second lens assembly including at least one lens exposed through another opening formed on the housing and arranged to the second image sensor,
a second glass plate spaced apart from the second image sensor and disposed between the second image sensor and the second lens assembly;
an anti-reflection layer disposed between the second glass plate and the second image sensor;
an infrared reflection layer disposed on the second glass plate;
a first layer comprising a single organic material layer disposed on the glass plate and configured to absorb a portion of infrared light among light transmitted through the lens assembly;
a second layer comprising a single inorganic material layer having rigidity, configured to protect the first layer, and disposed on the first layer; and
a processor configured to obtain a depth information on a subject in an image obtained through the second image sensor, based on data about light passing through a filter configured as the first glass plate, the first layer and the second layer through the first image sensor, the data obtained through the first image sensor;

wherein the anti-reflection layer and the infrared reflection layer include a plurality of inorganic layers including a low refractive layer and a high refractive layer alternately stacked.

15. The electronic device of claim 14, wherein the first layer includes a diimmonium-based compound and
wherein the second layer includes silicon dioxide ($SiO_2$) or titanium dioxide ($TiO_2$).

16. The electronic device of claim 14, wherein a distribution of light in a visible ray band among transmitted light passing through the first layer is maintained independent of a change in direction of incident light to the filter.

17. The electronic device of claim 14, wherein the processor is configured to obtain data for a monochromatic image through the first image sensor.

18. The electronic device of claim 14, wherein the filter is visible in green, by absorbing infrared light.

* * * * *